United States Patent Office 3,806,490
Patented Apr. 23, 1974

3,806,490
UNSATURATED POLYESTER COMPOSITION
Atsusuke Kajiura, Yuzo Aito, Hiroki Tamura, Atsushi Sugiyama, and Katsuhisa Watanabe, Tokyo, Japan, assignors to Teijin Limited, Osaka, Japan
No Drawing. Filed May 23, 1972, Ser. No. 256,148
Int. Cl. C08f 21/00, 21/02
U.S. Cl. 260—40 R                                    9 Claims

ABSTRACT OF THE DISCLOSURE

Improved curable unsaturated polyester composition comprising (a) an unsaturated polyester prepolymer, (b) a vinylmonomer copolymerizable with the prepolymer and (c) a polybutadiene principally of the 1,2-form or a modified derivative thereof, and a process for producing the same and a shaped polyester article obtained by the curing such composition.

---

This invention relates to an unsaturated polyester composition, a process for its production, and a shaped article produced from such composition.

Polyester resin shaped articles have previously been produced by polycondensing unsaturated dicarboxylic acids such as fumaric acid or maleic acid, anhydrides thereof, or mixtures such with saturated dicarboxylic acids such as phthalic acid or anhydrides thereof or ophthalic acid with polyhydric alcohols such as ethylene glycol or propylene glycol, mixing the resulting prepolymers with a copolymerizable vinyl monomer such as styrene, and curing the resulting unsaturated polyester resins in the presence of a catalyst such as benzoyl peroxide. The polyester resin articles obtained, however, are warped or cracked because of large shrinkage during curing. They also have disadvantages when they are reinforced by fibrous materials such as glass fibers, because the glass fibers tend to rise to the surface, making the appearance of the shaped article unsatisfactory.

Attempts have been made to add a thermoplastic polymer such as polyethylene, polystyrene, or poly(methacrylate) to the polyester resin in order to eliminate this defect. However, in order to reduce the volume shrinkage of the polyester resin during curing, it is necessary to add considerably large quantities of the polymer. In addition, when an additive such as pigments is incorporated in a polyester resin containing the above polymer, the floating or flooding of the pigment occurs, and the coloring of the shaped article becomes non-uniform.

It is an object of this invention to provide a novel and excellent unsaturated polyester composition which gives a polyester resin shaped article of good quality which is free from warping, cracks, or unevenness, and also from surface stickiness, has good smoothness, and can be uniformly colored when colored with a pigment.

It is another object of this invention to provide a process for producing such composition, and also reinforced articles obtained from such composition.

According to this invention, a curable unsaturated polyester composition is provided comprising:

(1) a prepolymer obtained by the reaction of an unsaturated dicarboxylic acid or a mixture thereof with a saturated dicarboxylic acid with a polyhydric alcohol,
(2) a vinyl monomer copolymerizable with the prepolymer, and
(3) at least one member selected from the group consisting of
  (a) a polybutadiene principally of the 1,2-form,
  (b) a polybutadiene principally of the 1,2-form having terminal hydroxyl or carboxyl groups,
  (c) a modified polybutadiene having terminal ester bonds derived from a polybutadiene principally of the 1,2-form and having terminal hydroxyl groups and an unsaturated mono- and/or dicarboxylic acid,
  (d) a terminal modified polybutadiene having terminal urethane linkages obtained by reacting a polybutadiene principally of the 1,2-form and having terminal hydroxyl groups with a mono- and/or diisocyanate,
  (e) a terminal modified polybutadiene obtained by reacting a polybutadiene principally of the 1,2-form and having terminal hydroxyl groups with a diisocyanate, and further reacting the product with a hydroxyalkyl acrylate or hydroxyalkyl methacrylate, and
  (f) a modified polybutadiene having as a pendant group a saturated dicarboxylic acid, obtained by the reaction of polybutadiene principally of the 1,2-form with an unsaturated dicarboxylic acid.

The unsaturated polyester composition of this invention has the property of very small volume shrinkage during curing when using the curing catalyst mentioned below. In addition, shaped articles obtained by this curing reaction are free from warping, cracks, and unevenness, and also from surface stickiness, have very good smoothness, and can be colored uniformly with a pigment. In addition, the molds used in the curing operation are not contaminated at all, and therefore, can be used repeatedly.

Especially preferred shaped articles that can be obtained by the curing reaction in this invention are shaped articles formed by casting, and fiber reinforced plastics obtained by the curing of a mixture of the unsaturated polyester resin with a filler such as calcium carbonate along with glass fibers as reinforcing material.

It has not been fully determined why the unsaturated polyester composition of this invention exhibits very small volume shrinkage during curing reaction, but it is assumed that it may be due to the following:

When the third component used in this invention is added to an uncured polyester resin composed of the first and second components, the third component is finely dispersed as an independent phase in a solution of the polyester resin in a way such that the "sea" of the polyester resin is dotted with a number of "islands" of the third component. If this composition is cured using a curing catalyst, the sea phase and the island phase are cured independently from each other, and the third component remains as an independent phase even after curing. Furthermore, in each island, voids occur as a result of the curing reaction. Thus the "sea" is dotted with the "islands" with the voids. This was confirmed by the microscopic observation of the polyester resin before and after curing. The voids present in the cured resin alleviate the volume shrinkage of the polyester resin caused during the curing reaction, and this is considered to bring about the low shrinkage of the polyester composition of the present invention. In other words, it is assumed that the desirable effect of low shrinkage is due to the presence of the third component added as an independent phase without being mixed with the polyester resin phase after curing. Accordingly, if some parts of the third component added are mixed with the polyester resin phase (sea phase) after the curing reaction, these portions are not considered to contribute to the low shrinkage of the polyester composition.

The prepolymer used as a first component of the composition of this invention is a linear unsaturated polyester obtained by esterification reaction between an unsaturated dicarboxylic acid or a mixture thereof with a saturated dicarboxylic acid and a polyhydric alcohol. As the unsaturated dicarboxylic acids, all unsaturated dicarboxylic acids that are usually used for preparation of unsaturated polyesters are useful. Examples of the unsaturated dicarboxylic acid that can be used are maleic acid, fumaric acid, itaconic acid, citraconic acid, anhydrides of these, such as maleic anhydride, or itaconic anhydride, which may be used either alone or in admixture. Examples of the saturated dicarboxylic acid that can be used together with the unsaturated dicarboxylic acid include aliphatic or aromatic dicarboxylic acids such as adipic acid, sebacic acid, succinic acid, phthalic acid, isophthalic acid, terephthalic acid, or methylphthalic acid, anhydrides of these such as succinic anhydride or phthalic anhydride, halogen-substituted derivatives of the dicarboxylic acids, such as tetrachlorophthalic anhydride. These saturated dicarboxylic acids can be used alone or in admixture.

Examples of the polyhydric alcohol that can be used in this invention include aliphatic or aromatic alcohols such as ethylene glycol, propylene glycol, diethylene glycol, dipropylene glycol, trimethyleneglycol, butanediol-1,3,-butanediol-1,4, hexanediol-1,6, neopentyl glycol, hydrogenated bisphenol-A, a propylene oxide adduct of bisphenol A, and ethylene oxide adduct of bisphenol-A, glycerol, pentaerythritol, and (polybutadiene)glycol. These alcohols can be used either alone or in admixture.

The preparation of a prepolymer from the unsaturated dicarboxylic acid (or mixture with a saturated dicarboxylic acid) and the polyhydric alcohol can be carried out by any known method of polycondensation. Usually, the polycondensation is carried out by heating the reactants to 150 to 250° C. in an inert gas. When the mixture of the unsaturated and saturated dicarboxylic acids is used in the preparation of the prepolymer, the molar ratio of the unsaturated dicarboxylic acid to the saturated dicarboxylic acid should preferably be at least 0.7, especially larger than 1.0.

The proportion of the dicarboxylic acid and the polyhydric alcohol is preferably 90/100 to 120/100, especially 100/100 to 110/100 in terms of the molar ratio of the OH group to the COOH group.

The prepolymer used in the present invention preferably has an acid value of at most 100.

Examples of the vinyl monomer copolymerizable with the prepolymer, which is used as a second component of the composition of this invention, include aliphatic or aromatic compounds such as styrene, vinyltoluene, alpha-methylstyrene, tert-butylstyrene, chlorostyrene, methyl methacrylate, ethyl methacrylate, vinyl acetate, diallyl phthalate, triallyl cyanurate, alpha-, beta-unsaturated dicarboxylic acids such as maleic acid, fumaric acid, citraconic acid, itaconic acid, or anhydrides of these, such as maleic acid anhydride, and alkyl esters such as methyl, ethyl, or butyl esters of these unsaturated dicarboxylic acids.

The characteristic feature of the composition of this invention is that it contains at least one compound selected from (a) to (f) above as a third component.

The "polybutadiene principally of 1,2-form" (a) means a polybutadiene in which at least 80 mol percent of the total recurring units are composed of 1,2-form units. In the present specification, this polybutadiene of 1,2-form will sometimes be referred to simply as polybutadiene. The molecular weight of such a polybutadiene is not critical in particular, but usually, those having a number average molecular weight of 300 to 10,000, perferably 500 to 5000, are used. The polybutadiene principally of the 1,2-form can be produced, for example, by anionic polymerization or living polymerization using a sodium dispersion of butadiene.

The "polybutadiene principally of 1,2-form and having terminal hydroxyl or carboxyl groups" (b) can be obtained by using carbon dioxide gas or ethylene oxide respectively as an end blocking agent in the preparation of the "polybutadiene" (a).

The "modified polybutadiene having terminal ester bonds" (c) can be produced for example by reacting a terminal hydroxyl-containing polybutadiene of the 1,2-form with an unsaturated mono- or dicarboxylic acid with heating in bulk or in an inert medium. Preferably, this reaction is carried out at a temperature not higher than 200° C. It is especially preferred to carry out this reaction in an atmosphere of an inert gas such as nitrogen gas. When the reaction is carried out at higher temperatures, it is preferred to add a polymerization inhibitor such as hydroquinone. The reaction product obtained is a terminal modified polybutadiene derived by the ester-forming reaction between the terminal hydroxyl group of the polybutadiene and the carboxyl group of the unsaturated mono- or dicarboxylic acid. This was confirmed by infrared spectrum analysis. This reaction may also be carried out using a catalyst for the esterification reaction. The amount of the unsaturated mono- or dicarboxylic acid is usually 0.5 to 1 mol per equivalent of the treminal hydroxyl group of the polybutadiene.

Examples of the unsaturated mono- or dicarboxylic acid used here include acrylic acid, methacrylic acid, maleic acid, fumaric acid, itaconic acid, maleic anhydride or itaconic anhydride, the methacrylic acid and maleic anhydride being especially preferred. Examples of the inert medium include aromatic hydrocarbons such as benzene, toluene and xylene, halogenated aromatic hydrocarbons such as chlorobenzene or dichlorobenzene, and aliphatic or alicyclic hydrocarbons such as n-hexane, n-heptane or cyclohexane. Especially preferred media are toluene and xylene.

The "modified polybutadiene having terminal urethane linkages" (d) can be produced, for example, by reacting a polybutadiene of 1,2-form having terminal hydroxyl groups with a mono- or di-isocyanate in an atmosphere of an inert gas with heating. The reaction product obtained is a terminal modified polybutadiene based on the urethane linkage between the terminal hydroxyl group of polybutadiene and the isocyanate. The amount of the mono- or diisocyanate used in this reaction is usually 0.5 to 1 mol per equivalent of the terminal hydroxyl groups of the polybutadiene. Examples of the mono- or diisocyanate are methyl isocyanate, ethyl isocyanate, n-butyl isocyanate, phenyl isocyanate, 2,4-toluene diisocyanate, 2,6-toluene-diisocyanate, and hexamethylene diisocyanate.

The "modified polybutadiene" (e) can be produced by reacting the polybutadiene of 1,2-form containing terminal hydroxyl groups with a diisocyanate under the same conditions as in the preparation of compound (d) above, and further reacting the resulting product with a hydroxyalkyl acrylate or hydroxyalkyl methacrylate. The amount of the hydroxyalkyl acrylate or hydroxyalkyl methacrylate is usually 0.5 to 1 mol per mol of the diisocyanate. Examples of the hydroxyalkyl acrylate and hydroxyalkyl methacrylate include hydroxyethyl acrylate, hydroxypropyl acrylate, hydroxyethyl methacrylate, and hydroxybutyl methacrylate.

The "modified polybutadiene having a saturated dicarboxylic acid as a pendant group" as defined in (f) can be produced by reacting a polybutadiene of 1,2-form with an unsaturated dicarboxylic acid utilizing the reactivity of the hydrogen atom attached to the carbon at the allyl position of the 1,2-polybutadiene. As a result of this reaction, the unsaturated dicarboxylic acid is attached to the carbon at the allyl position of the 1,2-polybutadiene through an unsaturated group, which results in the formation of a compound wherein the saturated dicarboxylic acid is bonded to the polymer chain as a pendant group. For example, when maleic anhydride is used as the unsaturated dicarboxylic acid, a modified polybutadiene is obtained in which the succinic anhydride units are pendant from the polymer chain as a result of the addition reaction. The pendant succinic anhydride units can be converted to a free acid form, or esters with alcohols. The amount of the unsaturated dicarboxylic acid used in this reaction is usually 1 to 25 mols, especially 2 to 15 mols, per 100 mols of the polybutadiene recurring units.

Of these compounds used as the third component, compounds (a), (b), (c) and (e) are preferred, and the use of compound (e) is especially preferred.

The composition of this invention comprising the above described first, second and third components can be cured by using a catalyst which is usually employed for the curing of polyester resins. This gives polyester shaped articles having superior properties. Examples of the curing catalyst that can be used in the present invention are organic peroxides such as benzoyl peroxide, di-tert.-butyl peroxide, cyclohexanone peroxide, or methyl ethyl ketone peroxide. It is possible to use a promoter such as cobalt naphthenate or dimethyl aniline together with the curing catalyst.

The proportions of the components of the composition of this invention are such that the amount of the second component is 20 to 250 parts by weight, preferably 30 to 150 parts by weight, per 100 parts by weight of the first component, and that the amount of the third component is 0.5 to 100 parts by weight, preferably 1 to 50 parts by weight, more preferably 2 to 20 parts by weight, per 100 parts by weight of the total amounts of the first and second components.

The amount of the curing catalyst that is used in the present invention is 0.1 to 5% by weight, preferably 0.5 to 3% by weight, based on the total amount of the first, second and third components of the composition of the present invention.

In the preparation of the composition of this invention, first the prepolymer as a first component is produced, and after completion of the preparation of the prepolymer, a vinyl monomer as a second component is added to the prepolymer, and the prepolymer is dissolved in the second component. The third component can be added at any time between the beginning of the polycondensation reaction for the preparation of the first component and before the beginning of the curing reaction of the polyester resin. From the standpoint of the dispersing effect of the third component, it is preferable to add the third component before completion of the prepolymer preparation. This gives a composition of good storage stability. However, since the third component contains a polymerizable unsaturated bond in its molecule, its addition before the completion of the prepolymer preparation is likely to cause undesirable polymerization if the conditions for the prepolymer preparation are too severe. Most preferably, therefore, the third component should be added after the preparation of the prepolymer and before the beginning of the curing reaction of the polyester resin. When it is desired to add the third component before the completion of the prepolymer preparation, it is preferred that it should be added in the latter stage of the prepolymer preparation, especially at a time when the acid value of the prepolymer reaches about 100 or below, and after addition, the polycondensation reaction should be carried out in an inert gas at 100° to 200° C. Furthermore, in this case, a radical polymerization inhibitor should preferably be added prior to the addition of the third component in order to prevent the polymerization or cross-linking reaction of the third component. Examples of the polymerization inhibitor are hydroquinone, p-tert.-butyl catechol, p-benzoquinone, and phenyl-beta-naphthylamine. In one embodiment, the third component may be partly added during the preparation of the prepolymer, and the remainder should be added during or after the stage of dissolving the prepolymer in a copolymerizable vinyl monomer. In this case, an emulsion of good storage stability can be obtained. The polybutadiene may be directly added, or after dissolving it in a copolymerizable vinyl monomer. Furthermore, when it is desired to add the third component after the prepolymer preparation, the above-mentioned modified polybutadiene may be added directly or after dissolving it in a copolymerizable vinyl monomer.

The unsaturated polyester composition of this invention so prepared does not undergo phase separation even upon storage for prolonged periods of time, showing great stability. Even when a pigment is incorporated in the polyester composition, the pigment does not show any floating or flooding. Where a higher stability is required, a small amount of a dispersing agent such as an adduct of castor oil and an alkylene oxide, or a copolymer of styrene and maleic anhydride modified with a long chain aliphatic alcohol may, for example, be added.

The present invention will be described in greater detail by the following examples, in which all parts are by weight unless otherwise specified.

Example 1

(A) A polymerization reactor equipped with a stirrer, a nitrogen gas inlet and a rectifier of the partial refluxing type was charged with 99.7 parts of isophthalic acid and 152.2 parts of proplyene glycol. After purging with a nitrogen gas, the above compounds were reacted for 10 hours in an oil bath at 200 to 210° C. while flowing a nitrogen gas at a rate of 50 ml./min. The temperature of the inside of the reactor was then lowered to 120° C., and 137.3 parts of maleic anhydride were added. The reaction mixture was heated for 5 hours at 190 to 210° C. At this time, the acid value of the reaction product was 53.0. The temperature of the inside of the reactor was lowered to 150° C., and 0.171 part of hydroquinone was placed in the reactor, followed by the dropwise addition of a solution consisting of 19.7 parts of polybutadiene (91.8% of the recurring units of the 1,2-polymer form) having a number average molecular weight of 1,350 and 20 parts of xylene. (The amount of the polybutadiene was 3% based on the total weight of the prepolymer and styrene.) Subsequently, the mixture was heated to 150 to 160° C. During this time, the flow rate of nitrogen gas was raised and xylene was evaporated off. In 2.5 hours, the temperature of the inside of the reactor was lowered to 120° C. to obtain a prepolymer having an acid value of 49.8. This prepolymer was mixed with 220 parts of styrene to form an unsaturated polyester resin.

(B) Five parts of polybutadiene (91.6% of the recurring units of the 1,2-polymer form) having a number average molecular weight of 4030 were added to 95 parts of the unsaturated polyester obtained above (A).

(C) To 100 parts of this mixture 10 parts of a blue pigment (a 10:1 mixture of TR White 42 and TR Blue 199, product of Toyo Ink Mfg. Co. Ltd.) were added. After thorough mixing, the mixture was allowed to stand. Even when it was allowed to stand for one week, the separation of the pigment did not occur.

(D) To the colored unsaturated polyester resin 1% by weight of benzoyl peroxide was added, and the polyester resin was cured in an oil bath at 115° C. The volume shrinkage of the polyester resin during the curing reaction was 1.5%.

(D) 60 parts of calcium carbonate were mixed with 100 parts of the above mixture of the colored unsaturated polyester resin and the catalyst, and a glass fiber reinforced shaped article was produced using a flat plate compression molding mold. The temperature of the mold was maintained at 120° C., the molding time was 5 minutes and the molding pressure was 20 kg./cm.$^2$. The glass fiber was used in the form of a chopped strand mat in an amount of 30% of the total amount of the cured shaped article. The glass fiber reinforced article so produced was free from warping, cracks, unevenness, non-uniformity of color, and surface stickiness, and had excellent surface smoothness. The mold used was not at all contaminated, and could be repeatedly used.

Example 2

A polymerization reactor of the same type as used in Example 1(A) was charged with 99.7 parts of isophthalic acid and 167.4 parts of propylene glycol, and after purging with a nitrogen gas, these compounds were reacted for 10 hours in the same way as in Example 1(A). Then, 137.3 parts of maleic anhydride were added, and the mixture was reacted for 5 hours at 190 to 210° C. At this time, the reaction product had an acid value of 31.4. The temperature of the inside of the reactor was then lowered to 150° C., and 0.179 part of hydroquinone was added. A solution consisting of 19.7 parts (3% based on the total amount of the prepolymer and styrene) of polybutadiene (89.8% of the recurring units of the 1,2-polymer form) having a number average molecular weight of 1,420 and containing a carboxyl group at both ends and 20 parts of toluene were added dropwise to the mixture. Subsequently, the mixture was heated at 150 to 160° C. for 3 hours to form a prepolymer having an acid value of 30.2. During this time, toluene was evaporated off. Then, the temperature of the inside of the reactor was lowered to 120° C., and the prepolymer was mixed with 238.4 parts of styrene to form an unsaturated polyester resin.

Five parts of polybutadiene (91.6% of the recurring units of the 1,2-polymer form) having a number average molecular weight of 4030 were mixed with 95 parts of the unsaturated polyester resin, and the resulting composition was colored and cured in the same way as set forth in Examples 1(C) and (D). The volume shrinkage was 2.2%. The colored unsaturated polyester resin was stable, and the color did not separate even after allowing it to stand for one week. The cured product was free from warping, cracks, unevenness, non-uniformity of color, and surface stickiness.

Example 3

A polymerization reactor of the same type as used in Example 1(A) was charged with 99.7 parts of isophthalic acid and 152.2 parts of propylene glycol, and after purging with a nitrogen gas, these compounds were reacted for 10 hours in the same way as set forth in Example 1(A). The temperature of the inside of the reactor was lowered to 120° C., and 137.3 parts of maleic anhydride were added. The mixture was again heated to 190 to 210° C. for 5 hours to continue the reaction. At this time, the reaction product had an acid value of 52.8. Then, the temperature of the inside of the reactor was lowered to 150° C., and 0.171 part of hydroquinone was added. Furthermore, a solution consisting of 31.3 parts (5% based on the total weight of the prepolymer and styrene) of polybutadiene having a number average molecular weight of 1420 and containing a hydroxyl group at both ends and 30 parts of xylene were added dropwise. The mixture was heated for 3.0 hours at 150 to 160° C. to form a prepolymer having an acid value of 46.8. The prepolymer was cooled to 120° C. and mixed with 228.3 parts of styrene to form an unsaturated polyester resin.

The unsaturated polyester resin was colored, and cured in the same way as set forth in Examples 1(C) and (D). The volume shrinkage was 4.1%. The shaped article obtained in the same way as set forth in Example 1(E) was free from warping, cracks, non-uniformity of color and surface stickiness, and the surface condition was very good. The colored unsaturated polyester resin was stable, and even when it was allowed to stand for one week, the color did not separate.

Comparative Example 1

A polymerization reactor of the same type as in Example 1(A) was charged with 99.7 parts of isophthalic acid and 167.4 parts of propylene glycol, and after purging with a nitrogen gas, these compounds were reacted for 10 hours in the same way as set forth in Example 1(A). The reaction mixture was cooled to 120° C., and 137.3 parts of maleic anhydride were added. The mixture was again reacted for 6 hours at 190 to 210° C. to form a prepolymer having an acid value of 27.7. To this prepolymer 0.179 part of hydroquinone was added, and the mixture was cooled to 120° C. The mixture was mixed with 238.4 parts of styrene to form an unsaturated polyester resin.

The unsaturated polyester resin so obtained was colored, and cured in the same way as set forth in Example 1(C) and Example 1(D). The volume shrinkage was as great as 8.3%.

Example 4

Sixty parts of the unsaturated polyester resin containing polybutadiene which was obtained in Example 3 were mixed with 35 parts of the prepolymer not containing polybutadiene which was obtained in Comparative Example 1, followed by further addition of 5 parts of polybutadiene (91.6% of the recurring units of the 1,2-polymer type) having a number average molecular weight of 4030. After thorough mixing the resultant mixture was colored, and cured in the same way as set forth in Examples 1(C) and (D). The volume shrinkage was 2.5%. A shaped article obtained from it in the same way as set forth in Example 1(E) was free from warping, cracks, unevenness, non-uniformity of color, and surface stickiness, and the surface condition was very good. The colored unsaturated polyester resin was stable, and even when it was allowed to stand for one week, the color did not separate.

Example 5

100 parts of isophthalic acid and 137 parts of propylene glycol were reacted in an autoclave at 210° C. and 2.0 kg./cm.$^2$ for 5 hours. To the reaction product 137 parts of maleic anhydride and 30 parts of propylene glycol were added and the mixture was polymerized at 190 to 210° C. in a stream of nitrogen. In about 5 hours, a light yellow unsaturated polyester (acid value about 20) was obtained. To this polyester 0.2 part of hydroquinone was added as a polymerization inhibitor. The polyester was then dissolved in 220 parts of styrene. The resulting unsaturated polyester resin was almost colorless and had a viscosity of 3.5 poises (at 25° C.).

Five parts of polybutadiene (number average molecular weight 3400; the amount of the recurring units of the 1,2-polymer form was 91% of the total recurring units) were added to 95 parts of this unsaturated polyester resin to form an unsaturated polyester resin composition. To the resultant composition 1 part of benzoyl peroxide was added as a curing catalyst. Ten grams of the mixture were placed in test tube, and cured in an oil bath at 115° C. The volume shrinkage determined on the basis of the specific gravities of the resin before and after curing was 2.8%.

A mixture of TR White 42 and TR Blue 199 in a ratio of 10:1 was added to the resulting unsaturated polyester resin composition, and thoroughly stirred. Five grams of the resultant mixture were coated on a polyester film over an area of about 5 x 7 cm., and further, 5 g. of the mixture were poured on top of it. Even after a lapse of 5 minutes from this pouring operation, the pigment did not separate, and the color was uniform.

For comparison, an unsaturated polyester composition was prepared in the same way as in Example 1 except that polystyrene (Styron 683, Asahi Dow) was used instead of the polybutadiene. Using this compostion, the pigment separation test was conducted in the same way as set forth in Example 4. After the pouring operation, the pigment immediately separated, and in 5 minutes, a clear non-uniformity of color was observed.

For comparison, an unsaturated polyester composition was prepared in the same way as in Example 5 except that polybutadiene was not added. The shrinkage of the composition during curing was found to be as great as 7.3%.

Example 6

(A) 30.3 parts of polybutadiene (91.6% of the recurring units of the 1,2-polymer form) having a number average molecular weight of 3030 and containing a hydroxyl group at both ends were dissolved in 60 parts of xylene, followed by addition of 1.96 parts of maleic anhydride (molar ratio of polybutadiene to maleic anhydride being 1:2) and 0.016 part of hydroquinone as a radical polymerization inhibitor. The mixture was heated for 5.0 hours at the boiling point of xylene. Xylene was evaporated off from the resultant uniform solution. A slightly yellow, very viscous liquid of polybutadiene whose ends had been modified with maleic acid was obtained. This polybutadiene had a number average molecular weight of 3560. By the infrared absorption spectrum, the absorption of the hydroxyl group disappeared, and the appearance of absorption due to the ester-type carbonyl group was observed. In other words, it was confirmed that the hydroxyl groups at the ends of 1,2-polybutadiene reacted with maleic anhydride to form an ester bond.

(B) A polymerization reactor equipped with a stirrer, a thermometer, a nitrogen gas inlet and a partial reflux-type rectifier was charged with 99.7 parts of isophthalic acid and 167.1 parts of propylene glycol. After purging with a nitrogen gas, these compounds were reacted for 10 hours in an oil bath at 190 to 200° C. while flowing a nitrogen gas at a rate of 50 ml./min. The temperature of the inside of the reactor was then lowered to 120° C., and 137.3 parts of maleic anhydride were added. The mixture was again heated, and reacted at 190 to 210° C. for 6 hours to form a prepolymer having an acid value of 23.6. The prepolymer was then mixed with 238.4 parts of styrene to form an unsaturated polyester resin.

(C) To 95 parts of the unsaturated polyester resin obtained in (B) above 5 parts of the modified polybutadiene prepared in (A) above and one part of castor oil modified with ethylene oxide were added, and the mixture was colored by addition of 10 parts of a blue pigment (a 10:1 mixture of TR White 42 and TR Blue 199). The mixture was thoroughly mingled, and then allowed to stand. The floating or flooding did not occur even after a lapse of 48 hours. One part of benzoyl peroxide was added to the colored unsaturated polyester resin, and the mixture was taken in a test tube and cured in an oil bath at 115° C. to form a polyester shaped article. The volume shrinkage as measured on the basis of the specific gravities of the polyester before and after curing was 3.3%.

(D) Sixty parts of calcium carbonate were admixed with 100 parts of a mixture of the colored unsaturated polyester and the catalyst, and the mixture was fabricated into a glass fiber reinforced article using a flat plate compression molding mold. The temperature of the mold was maintained at 120° C., and the molding time was 5 minutes with a molding pressure of 20 kg./cm.². The chopped strand mat was used in an amount of 30% of the total weight of the cured shaped article. The glass fiber reinforced shaped article so produced was free from warping, cracks, unevenness, floating or flooding of color, and the surface stickiness, and surface smoothness were very good. The mold used was not at all contaminated, and could be used repeatedly.

Example 7

30.3 parts of polybutadiene (91.6% of the recurring units of the 1,2-polymer form) having a number average molecular weight of 3030 and containing a hydroxyl group at both ends were dissolved in 60 parts of xylene, followed by the addition of 2.24 parts of itaconic anhydride (the molar ratio of polybutadiene to itaconic anhydride being 1:2) and 0.016 part of hydroquinone. The mixture was heated for 6 hours at the boiling point of xylene. Then, xylene was evaporated off to form a very viscous liquid of terminal-modified polybutadiene.

To 95 parts of the unsaturated polyester resin obtained in Example 6(B) 5 parts of the above modified polybutadiene and 1 part of castor oil modified with ethylene oxide were added. The mixture was colored, and cured in the same way as set forth in Examples 6(C) and (D). The volume shrinkage during curing was 3.2%. The resultant shaped article was free from floating or flooding of color and surface stickiness, and the surface smoothness of the article was very good. The colored polyester resin was stable, and even when it was allowed to stand for 48 hours, the separation of the color did not occur.

Example 8

30.3 parts of polybutadiene (91.6% of the recurring units of the 1,2-polymer form) having a number average molecular weight of 3030 and containing a hydroxyl group at both ends were dissolved in 60 parts of xylene, followed by the addition of 2.32 parts of fumaric acid (the molar ratio of polybutadiene to fumaric acid being 1:2), 0.016 part of hydroquinone and 0.032 part of p-toluenesulfonic acid. The mixture was heated under reflux for 10 hours at the boiling point of xylene. Then, xylene was evaporated off, and a very viscous liquid of terminal-modified polybutadiene was obtained.

To 95 parts of the unsaturated polyester resin obtained in Example 6(B) 5 parts of the above modified polybutadiene and 1 part of castor oil modified with ethylene oxide were added. The mixture was colored, and cured in the same was as set forth in Examples 6(C) and (D). The volume shrinkage of the composition during curing was found to be as small as 3.0%. The cured shaped product was free from non-uniformity of color and surface stickiness, and the surface smoothness was very good. The colored polyester resin was stable, and even when it was allowed to stand for 48 hours, the floating or flooding of the color did not occur.

Example 9

(A) 14.2 parts of polybutadiene (89.9% of the recurring units of the 1,2-polymer form) having a number average molecular weight of 1420 and containing a hydroxyl group at both ends were dissolved in 30 parts of toluene, followed by the addition of 2.0 parts of maleic anhydride (the molar ratio of polybutadiene to maleic anhydride being 1:2) and 0.008 parts of hydroquinone as a radical polymerization inhibitor. The mixture was heated for 2.5 hours at the boiling point of toluene. Toluene was evaporated off, and a viscous liquid of terminal-modified polybutadiene was obtained.

(B) A polymerization reactor of the same type as used in Example 6(B) was charged with 88.9 parts of phthalic anhydride, 137.3 parts of maleic anhydride and 167.4 parts of propylene glycol. These compounds were reacted at 190 to 200° C. for 8.0 hours while flowing a nitrogen gas, to form an almost colorless prepolymer having an acid value of 27.1. To the prepolymer 0.179 part of hydroquinone was added as a polymerization inhibitor, and the mixture was then mixed with 238.4 parts of styrene to form an unsaturated polyester resin.

(C) To 95 parts of the unsaturated polyester resin obtained in (B) above 5 parts of the terminal-modified polybutadiene prepared in (A) above and 1 part of castor oil modified with ethylene oxide were added. The mixture was colored, and cured in the same way as set forth in Examples 1(C) and (D). The volume shrinkage was as low as 3.5%. The resultant cured shaped article was free from color non-uniformity and surface stickiness, and the surface smoothness was very good. The colored polyester resin was stable, and even when it was allowed to stand for 48 hours, the floating or flooding of the color did not occur.

Comparative Example 2

The unsaturated polyester resin obtained in Example 9(B) was mixed with a styrene solution of polystyrene, and the mixture was colored, and cured in the same was as set forth in Examples 6(C) and (D). The following results were obtained.

| Composition (wt. percent) | | Volume shrinkage of the composition after curing (percent) |
| --- | --- | --- |
| Unsaturated polyester resin | Polystyrene | |
| 95 | 5 | 5.8 |
| 90 | 10 | 5.0 |

This indicates that even larger quantities of polystyrene were not sufficient to reduce the shrinkage enough, and the use of 10% by weight of polystyrene only gave a shrinkage of 5.0%. In addition, the cured shaped article showed flooding to a large extent.

Example 10

(A) 30.3 parts of polybutadiene (91.6% of the recurring units of the 1,2-polymer form) having a number average molecular weight of 3030 and containing a hydroxyl group at both ends were dissolved in 60 parts of xylene, followed by the addition of 1.72 parts of methacrylic acid (the molar ratio of polybutadiene to methacrylic acid being 1:2) and 0.016 part of hydroquinone as a radical polymerization inhibitor. The mixture was heated for 5.0 hours at the boiling point of xylene. Then, xylene was evaporated off at reduced pressure, and a viscous liquid of 1,2-polybutadiene whose ends were modified with methacrylic acid was obtained. This modified polybutadiene had a number average molecular weight of 3340. By the infrared absorption spectrum, the disappearance of the hydroxyl groups and the formation of an ester bond were observed.

(B) To 95 parts of the unsaturated polyester resin obtained in Example 9(B) 5 parts of the above terminal-modified polybutadiene and 1 part of castor oil modified with ethylene oxide were added. The mixture was colored, and cured in the same way as set forth in Examples 6(C) and (D). The volume shrinkage was found to be as low as 2.5%. The shaped article obtained showed no floating or flooding of color and surface stickiness, and the surface smoothness was very good.

Example 11

To 95 parts of the unsaturated polyester resin obtained in Example 6(B) 5 parts of modified polybutadiene (PB BN-1000, product of Nippon Soda Kabushiki Kaisha, maleic anhydride content 6.4%) having a succinic anhydride pendant group as a result of addition reaction of maleic anhydride with 1,2-polybutadiene, and 1 part of castor oil modified with ethylene oxide were added. The mixture was colored, and cured in the same way as Examples 6(C) and (D). The volume shrinkage at the time of curing was as low as 3.3%. The resulting shaped article was free from nonuniformity of color and surface stickiness, and the surface smoothness was very good.

Example 12

To 95 parts of the unsaturated polyester resin obtained in Example 6(B), 5 parts of urethanated polybutadiene (GTE 2110, product of Nippon Soda Kabushiki Kaisha), which had been obtained by reacting polybutadiene having a hydroxyl group at both ends with 2 molar times its amount of toluene diisocyanate, and then reacting the product further with 2 molar times its amount of hydroxyethyl methacrylate, and 1 part of castor oil modified with ethylene oxide were added. The mixture was colored, and cured in the same way as set forth in Examples 6(C) and (D). The volume shrinkage during curing was as low as 3.8%. The shaped article obtained was free from non-uniformity of color and surface stickiness, and the surface smoothness was very good.

Example 13

A polymerization reactor of the same type as used in Example 6(B) was charged with 88.9 parts of phthalic anhydride, 137.3 parts of maleic anhydride and 152.2 parts of propylene glycol. After purging with a nitrogen gas, these compounds were reacted for 5 hours at 100 to 200° C. At this time, the acid value of the product was 50.2. The temperature of the inside of the reactor was lowered to 150° C., and 0.171 part of hydroquinone was added. A solution of 51.8 parts (8% by weight based on the total amount of the prepolymer and styrene) of the modified polybutadiene obtained in Example 6(A) and 30 parts of toluene were further added dropwise, and the mixture was heated for 2 hours at 150 to 160° C. During this time, toluene was evaporated off to form a prepolymer having an acid value of 47.3. The prepolymer was cooled to 120° C., and then dissolved in 228.3 parts of styrene to form an unsaturated polyester resin.

The unsaturated polyester resin so obtained was colored, and cured in the same way as set forth in Examples 6(C) and (D). The volume shrinkage during curing was as low as 2.4%. The resultant shaped article was free from non-uniformity of color and surface stickiness, and the surface smoothness was very good.

Example 14

Example 13 was repeated except that instead of the modified polybutadiene used in Example 13, 51.8 parts of modified polybutadiene (PB BN-1000) used in Example 11 were employed, and the amount of toluene was changed to 50 parts. A prepolymer having an acid value of 48.2 was obtained. The prepolymer was dissolved in styrene in the same way as set forth in Example 13, and the mixture was colored and cured in the same way as set forth in Examples 6(C) and (D). The resulting shaped article was free from non-uniformity of color and surface stickiness, and the smoothness of the surface was very good.

Example 15

(A) A reactor equipped with a stirrer, a thermometer, a nitrogen gas inlet and a dropping funnel was charged with 19.8 parts of polybutadiene (91.6% of the recurring units of the 1,2-polymer form) having a number average molecular weight of 1980 and containing a hydroxyl group at both ends and 0.005 part of p-benzoquinone as a radical polymerization inhibitor. While blowing a nitrogen gas into the reactor, these compounds were heated at 100° C. under stirring. Then, through a dropping funnel, 3.5 parts (20 molar times the 1,2-polybutadiene) of 2,4-toluenediisocyanate were added dropwise. After completion of the addition, the mixture was heated at the same temperature for an hour, and then cooled to form a light brownish yellow viscous oily matter of polybutadiene modified with the isocyanate.

(B) To 95 parts of the unsaturated polyester resin obtained in Example 6(B) 5 parts of the polybutadiene obtained in (A) above, and 1 part of castor oil modified with ethylene oxide were added. The mixture was colored, and cured in the same way as set forth in Examples 6(C) and (D). The volume shrinkage at the time of curing was as low as 3.5%. The resulting shaped article was free from nonuniformity of color and surface stickiness, and the surface smoothness was very good.

Example 16

To 95 parts of the unsaturated polyester resin obtained in Example 1(A) 3 parts of polybutadiene having a number average molecular weight of 4030 which was used in Example 1(B) and 3 parts of the urethanated polybutadiene used in Example 12 were added to form an unsaturated polyester composition. The resulting composition was colored, and cured in the same way as set forth in Examples 1(C) and (D). The volume shrinkage at the time of curing was as low as 1.2%. The cured shaped article was free from warping, cracks, and nonuniformity of color, and the surface smoothness was very good.

Example 17

Eight parts of 1,2-polybutadiene (91.6% of the recurring units of the 1,2-polymer form; number average molecular weight 4030) were mixed with 92 parts of an unsaturated polyester resin (styrene monomer content of 50%) prepared from bisphenol A/propylene oxide adduct and maleic anhydride, followed by the addition of one part of benzoyl peroxide. The mixture was cured in an oil bath at 115° C. A cured product was obtained which was whitely turbid on the whole. The volume shrinkage measured on the basis of the specific gravities of the composition before and after curing was less than 2%, which indicates superior low shrinkage effect. Microscopic examination of the resin before and after curing indicates that 1,2-polybutadiene existed as an independent phase in the polyester resin phase.

For comparison, the same curing reaction as above was performed using 8 parts of epoxidated polybutadiene (PB, BF-1000, product of Nippon Soda Kabushiki Kaisha) having an epoxy oxygen content of 5.2% instead of 8 parts of the above polybutadiene. A uniform transparent cured product was obtained. The volume shrinkage measured from the specific gravities before and after curing was 7.3%.

What is claimed is:

1. A curable unsaturated polyester composition comprising:
    (1) a prepolymer obtained by the reaction of an unsaturated dicarboxylic acid or a mixture of said unsaturated dicarboxylic acid with a saturated dicarboxylic acid with a polyhydric alcohol,
    (2) a vinyl monomer copolymerizable with said prepolymer, and
    (3) at least one member selected from the group consisting of
        (a) a polybutadiene in which at least 80 mole percent of the total recurring units are 1,2-form units,
        (b) a polybutadiene in which at least 80 mole percent of the total recurring units are 1,2-form having terminal hydroxyl or carboxyl groups,
        (c) a modified polybutadiene having terminal ester bonds derived from a polybutadiene in which at least 80 mole percent of the total recuring units are 1,2-form and having terminal hydroxyl groups and an unsaturated monocarboxylic acid, dicarboxylic acid or mixture thereof,
        (d) a terminal modified polybutadiene having terminal urethane linkages obtained by reacting a polybutadiene in which at least 80 mole percent of the total recurring units are 1,2-form and having terminal hydroxyl groups with monodiisocyano, diisocyanate or mixture thereof,
        (e) a terminal modified polybutadiene obtained by reacting a polybutadiene in which at least 80 mole percent of the total recurring units are 1,2-form and having terminal hydroxyl groups with a diisocyanate, and further reacting the product with a hydroxylalkyl acrylate or methacrylate, and
        (f) a modified polybutadiene having as a pendant group a saturated dicarboxylic acid, obtained by the reaction of polybutadiene in which at least 80 mole percent of the total recurring units are 1,2-form with an unsaturated dicarboxylic acid, wherein the amount of the vinyl monomer component (2) is at least 20 parts per 220 parts of combined prepolymer component (1) and polybutadiene component (3).

2. The composition of claim 1, wherein the amount of the vinyl monomer (2) is 20 to 250 parts by weight per 100 parts by weight of the prepolymer (1), and the amount of component (3) is 0.5 to 100 parts by weight per 100 parts by weight of the total amount of components (1) and (2).

3. The composition of claim 1, wherein the component (3) is selected from (a), (b), (c) and (e).

4. The composition of claim 1, wherein component (3) is (e).

5. A process for producing a curable unsaturated polyester composition comprising:
    (1) a prepolymer obtained by the reaction of unsaturated dicarboxylic acid or a mixture of said unsaturated carboxylic acid with a saturated dicarboxylic acid, with a polyhydric alcohol,
    (2) a vinyl monomer copolymerizable with said prepolymer, and
    (3) at least one member selected from the group consisting of
        (a) a polybutadiene in which at least 80 mole percent of the total recurring units are 1,2-form,
        (b) a polybutadiene in which at least 80 mole percent of the total recurring units are 1,2-form having terminal hydroxyl or carboxy groups,
        (c) a modified polybutadiene having terminal ester bonds derived from a polybutadiene in which at least 80 mole percent of the total recurring units are 1,2-form and having terminal hydroxyl groups and an unsaturated monocarboxylic acid, di-carboxylic acid, or mixture thereof,
        (d) a terminal modified polybutadiene having terminal urethane linkages obtained by reacting a polybutadiene in which at least 80 mole percent of the total recurring units are 1,2-form and having terminal hydroxyl groups with mono-diisocyano, diisocyanate, or mixture thereof,
        (e) a terminal modified polybutadiene obtained by reacting a polybutadiene in which at least 80 mole percent of the total recurring units are 1,2-form and having terminal hydroxyl groups with a diisocyanate, and further reacting the product with a hydroxyalkyl acrylate or methacrylate, and
        (f) a modified polybutadiene having as a pendant group a saturated dicarboxylic acid, obtained by the reaction of polybutadiene in which at least 80 mole percent of the total recurring units are 1,2-form with an unsaturated dicarboxylic acid,
    wherein component (3) is added to the reaction system for the preparation of the prepolymer (1) after the initiation of the reaction for forming the prepolymer, and the vinyl monomer (2) is added after completion of the reaction for forming the prepolymer.

6. The process of claim 5, wherein both components (2) and (3) are added after completion of the reaction for forming the prepolymer.

7. A shaped polyester article obtained by curing the unsaturated polyester composition of claim 1.

8. The shaped article of claim 7 wherein said article is fabricated by casting.

9. The shaped article of claim 7, wherein said article is a fiber reinforced resin using glass fibers as a reinforcing material.

References Cited

UNITED STATES PATENTS

| | | | |
|---|---|---|---|
| 2,609,353 | 9/1952 | Rubens et al. | 260—862 |
| 2,631,175 | 3/1953 | Crouch | 260—669 |
| 3,231,634 | 1/1966 | Wismer et al. | 260—862 |
| 3,518,213 | 6/1970 | Miyoshi et al. | 260—22 |
| 3,620,900 | 11/1971 | Williger | 161—162 |

OTHER REFERENCES

Kennedy and Torquist, "Polymer Chemistry of Synthetic Elastomers," part II, vol. XXIII, Interscience (1969), pp. 491, 564–571.

HAROLD D. ANDERSON, Primary Examiner

E. A. NIELSON, Assistant Examiner

U.S. Cl. X.R.

260—33.6 UA, 862

UNITED STATES PATENT OFFICE
CERTIFICATE OF CORRECTION

Patent No. 3,806,490                Dated April 23, 1974

Inventor(s)    Atsusuke KAJIURA ET AL

It is certified that error appears in the above-identified patent and that said Letters Patent are hereby corrected as shown below:

In the Heading, insert the following Foreign Filing Information:

-- Claims priority, application Japan, May 27, 1971,

No. 46-36562/71; application Japan, June 10, 1971,

No. 46-41337/71. --

Signed and sealed this 24th day of September 1974.

(SEAL)
Attest:

McCOY M. GIBSON JR.
Attesting Officer

C. MARSHALL DANN
Commissioner of Patents